E. C. MIDGLEY.
SNOW REMOVING MACHINE.
APPLICATION FILED MAR. 8, 1920.
1,392,877.
Patented Oct. 4, 1921.
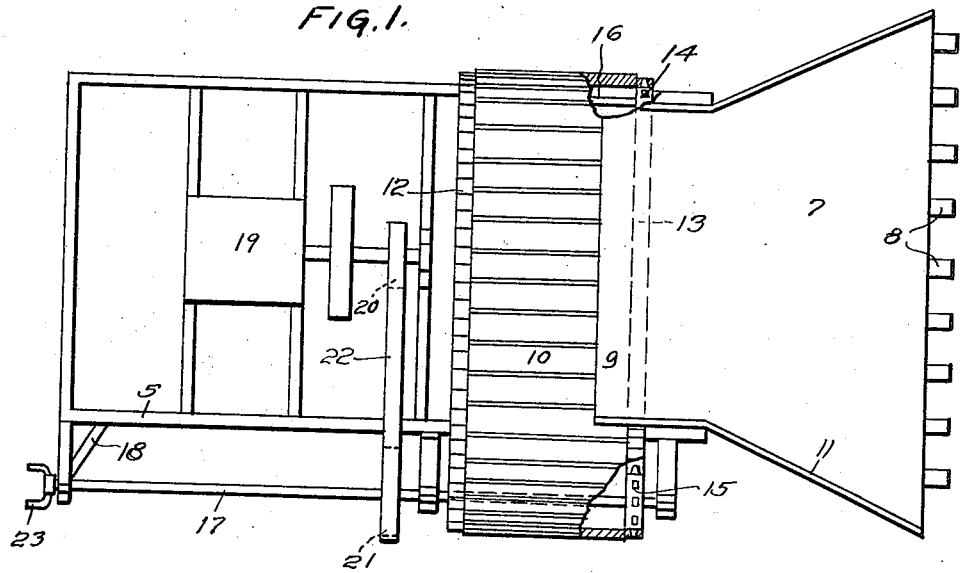
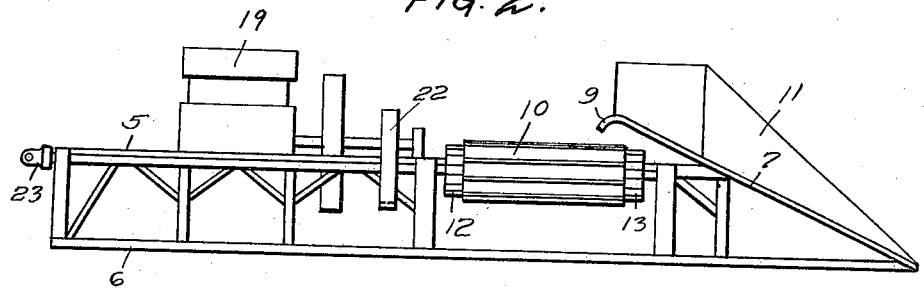
Witnesses
Inventor
E. C. Midgley,
By Samuel Herrick
Attorney

UNITED STATES PATENT OFFICE.

ERNEST C. MIDGLEY, OF WHEATLAND, NORTH DAKOTA.

SNOW-REMOVING MACHINE.

1,392,877.   Specification of Letters Patent.   Patented Oct. 4, 1921.

Application filed March 8, 1920. Serial No. 364,038.

*To all whom it may concern:*

Be it known that I, ERNEST C. MIDGLEY, a citizen of the United States of America, residing at Wheatland, in the county of Cass and State of North Dakota, have invented certain new and useful Improvements in Snow-Removing Machines, of which the following is a specification.

This invention relates to snow removing machines and it has for its object the provision of a simple, compact and economical structure adapted to be pushed ahead of a tractor or other propelling device and to pick up the snow and deposit the same upon a conveyer which continuously discharges the snow to one side of the line of travel of the apparatus.

Further objects and advantages of the invention will be set forth in the following detailed description.

In the accompanying drawing, in which like reference characters designate corresponding parts in both of the figures;

Figure 1 is a plan view of a snow remover constructed in accordance with the invention; and Fig. 2 is a side elevation thereof.

Referring to the drawing, 5 designates a supporting frame that is preferably mounted upon runners 6 to adapt it to be pushed along the ground by means of a tractor or other motor vehicle, not shown. A sloping flaring sheet steel plate extends entirely across the front of the apparatus and is provided with teeth 8 along its front edge. The length of the front edge of the plate 7 exceeds the width of the frame 5 so that it extends upon opposite sides of the line of travel of the apparatus, to thereby completely clear a path for the runners 6. The upper rear edge of the plate 7 is curved downwardly at 9 over a lateral conveyer 10 and said plate 7 is provided with upstanding wings 11 at its ends which act as snow guards and prevent the snow from falling laterally from said plate.

The conveyer 10 is preferably of the well known slated type, though a plain belt may be used if preferred. The slats of the conveyer are carried by sprocket chains 12 and 13 which pass over sprocket wheels 14 and 15 carried by shafts 16 and 17, respectively. The shaft 17 is mounted upon brackets 18 carried by the frame 5 and projecting far enough from the side of said frame to cause the conveyer to extend to a point where it will discharge the snow entirely to one side of the line of travel of the apparatus. The conveyer is preferably driven by an engine 19 mounted upon the frame 5 through pulleys 20 and 21 and belt 22, though this engine may be dispensed with and the shaft 17 be driven from some other source, to which end I extend shaft 17 rearwardly beyond the frame 5 and provide upon its rear end a driving member, here indicated as an element of a universal connection 23, though it may take the form of a pinion, pulley, sprocket wheel or other element by which the shaft 17 may be rotated from an extraneous source of power, as for example, by the engine of the pushing tractor.

It is to be understood that the invention is not limited to the precise construction set forth, but that it includes within its purview whatever changes fairly come within either the terms or the spirit of the appended claim.

Having described my invention, what I claim is:

In a snow removing machine, a portable frame, an inclined plate extending entirely across the front thereof and beyond the line of travel of the frame, said plate having upstanding wings at its opposite sides and converging upwardly and rearwardly to come within the confines of the portable frame, a laterally acting horizontal conveyer disposed beneath the upper rear edge of said plate upon said frame and extending in substantial parallelism therewith, the discharge end of said conveyer being extended beyond the line of travel of the front edge of the plate, said conveyer comprising an endless traveling flight and rotative elements over which said flight passes and by means of which movement is imparted to said flight, a shaft supported from the side of the portable frame and outwardly thereof and upon which said rotative elements are mounted and a power imparting element at the rear end of said shaft by means of which motion may be imparted to said shaft from a point outside the portable frame.

In testimony whereof I affix my signature in the presence of two witnesses.

ERNEST C. MIDGLEY.

Witnesses:
EMERSON H. SMITH,
NORA T. SHEA.